United States Patent
Yamaki et al.

(10) Patent No.: US 6,873,801 B1
(45) Date of Patent: Mar. 29, 2005

(54) OPTICAL TRANSMITTER AND OPTICAL TRANSMISSION SYSTEM USING ELECTRO ABSORPTION MODULATOR

(75) Inventors: Kazuyoshi Yamaki, Yokohama (JP); Hideyuki Serizawa, Nagano (JP)

(73) Assignee: Opnext Japan, Inc., Yokohama (JP)

( * ) Notice: Subject to any disclaimer, the term of this patent is extended or adjusted under 35 U.S.C. 154(b) by 632 days.

(21) Appl. No.: 09/649,741

(22) Filed: Aug. 28, 2000

(30) Foreign Application Priority Data

Mar. 7, 2000 (JP) ................................. P2000-067151

(51) Int. Cl.[7] ............................................. H04B 10/04
(52) U.S. Cl. ................................... 398/198; 398/197
(58) Field of Search ............................... 398/198, 197; 372/29.01, 38.02

(56) References Cited

U.S. PATENT DOCUMENTS

| | | | | |
|---|---|---|---|---|
| 5,706,117 A | * | 1/1998 | Imai et al. ................... | 359/187 |
| 5,900,621 A | * | 5/1999 | Nagakubo et al. .......... | 250/205 |
| 6,580,531 B1 | * | 6/2003 | Swanson et al. ............... | 398/5 |

FOREIGN PATENT DOCUMENTS

| JP | 6-152043 | 5/1994 |
|---|---|---|
| JP | 9-179079 | 7/1997 |
| JP | 11-119176 | 4/1999 |

* cited by examiner

Primary Examiner—Jason Chan
Assistant Examiner—Shi K. Li
(74) Attorney, Agent, or Firm—Knoble Yoshida & Dunleavy

(57) ABSTRACT

In the application of the optical transmitter to any system for the compensation of passing degradation, the invention provides the optical transmitter which maintains constant modulator output and the highly reliable optical transmission by tuning, the alpha parameter for given systems.

As the optical element back-face output power detected by PD6 depends on the optical element driving current amount, the electronic absorption amount of the EA optical modulator monitored by the electronic absorption monitor depends on the optical output of the optical element 5 and the EA optical modulator driving point of the driving part 8. It is possible to detect a change in the driving point in the EA optical modulator by taking a difference between the amount monitored by the PD 6 and the amount monitored by the electronic absorption monitor. Consequently by applying to the driving current source 10 the current corresponding to the change of the EA optical modulator driving point, it is possible to automatically compensate the modulator output 7 when the driving point of the EA optical modulator changes due to the change of the alpha parameter and the passing degradation.

17 Claims, 7 Drawing Sheets

| VOH [V] | VOL [V] | IF [mA] | Poutput [dBm] | Vdata [mV] | Vbar [mV] | Vpd [mV] | \|Vbar\|+\|Vpd\|-\|Vdata\| [mV] |
|---|---|---|---|---|---|---|---|
| -0.2 | -1.8 | 38.1 | 0 | -869 | -1006 | 921 | 1058 |
| -0.3 | -1.9 | 42.5 | 0 | -956 | -995 | 1016 | 1055 |
| -0.2 | -1.9 | 38.2 | 0 | -914 | -1064 | 920 | 1070 |
| -0.1 | -1.7 | 34.9 | 0 | -797 | -1005 | 848 | 1056 |
| -0.4 | -2.0 | 47.7 | 0 | -1067 | -1016 | 1128 | 1077 |
| -0.5 | -2.0 | 52.5 | 0 | -1119 | -945 | 1229 | 1055 |
| -0.3 | -2.1 | 43.2 | 0 | -1092 | -1128 | 1031 | 1067 |

OPTICAL TRANSMITTER AND OPTICAL TRANSMISSION SYSTEM USING ELECTRO ABSORPTION MODULATOR

BACKGROUND OF THE INVENTION

This invention relates to the electric field absorption type or Electro Absorption (EA) optical modulator and the optical transmission system that applies to the optical transmitter which drives the Distributed Feed-Back (DFB) laser and the accumulated EA/DFB integration optical source.

The development of optical transmitters for high-speed optical transmission has experienced tremendous growth in the information communication market in recent years. The fiber loss becomes the smallest to develop a relay distance if a laser beam is in the 1.5 µm band in the optical source or the optical element of the optical transmitters. However, the most of existing fibers are usual dispersion fibers which have the group velocity dispersion of 0 in the band light of 1.3 µm. For this reason, the group velocity distributing by the usual dispersion fibers is large in the band light of 1.5 µm.

The large group velocity dispersion is caused by chirping that is one of the characteristics of the optical transmitter. Due to chirping, the transmission degradation of the optical pulse occurs. Optical amplifiers are used in long-range transmission, and the waveform degradation by the non-linear effect of the optical fibers occurs.

The chirping is frequency flicker which accompanies the optical amplitude modulation. To carry out high quality high-speed optical transmission along the usual dispersion fiber line, it is important to optimally reduce the chirping of the optical transmitter and to consider the non-linear effect of the optical fiber in the implementation on circuits. IEEE PHOTONICS TECHNOLOGY LETTERS, VOL. 8. No. 7, JULY in 1996 in page 944–946.

For an over-10 G bit/s-high-speed optical transmitter with the usual dispersion fiber line, the method of externally modulating low chirping characteristic is better than the method of directly modulating, and the method of external modulation must be adapted. Especially it is observed a laser optical source is carefully integrated. The external modulation is integrated with the EA/DFB optical source for practical use.

The merit of using the EA/DFB integration optical source includes the reduction in an optical transmitter size and the electric power consumption. For example, the merit is described: Electronic Information Communication Society, Communication rally B-10-91 in 1999 and IEEE GLOBECOM1996 CONFERENCE RECORD, page 1916–1919. The EA/DFB optical source is used as a favorable optical source or the optical element in the high-speed Wavelength Division Multiplexing (WDM) system as well as the Time Division Multiplexing (TDM) system. These WDM and TDM systems are extensively studied and developed in recent years.

The chirping of the EA optical modulator or the EA/DFB integration optical source is characterized by the refraction ratio variation and the optical absorption coefficient variation. The refraction ratio is called alpha parameter. The close relation exists between the alpha parameter and the fiber transmission characteristic. Consequently, it is important to control the fiber transmission characteristic of the optical transmitter that is equipped with the EA optical modulator or the EA/DFB integration optical source to control the alpha parameter for optimizing the performance.

FIG. 1 shows a measurement result that is the alpha parameter ("a") of the EA optical modulator. The normalized optical output ratio characteristic is also shown with respect to the applied voltage ("Vea") to the EA optical modulator. From the figure, it is understood that the alpha parameter and the normalized optical output ratio characteristic are dependent on the EA optical modulator applied voltage. It is possible to control the normalized optical output ratio by controlling the bias voltage and driving the amplitude of vibration with the EA optical modulator driving voltage.

There is a method of compensating the alpha parameter of the EA optical modulator set in to fit the EA modulator in any optical transmission system as well as to stabilize the EA optical modulator characteristic.

FIG. 2 shows a transmitter sample as shown in JP11-119176. A driving part 8 drives an EA optical modulator 4 in response to the vibration amplitude of a bias and amplitude controller 9. The EA optical modulator 4 modulates output light from an optical element or optical source 5 and outputs modulator output light 7. The optical output power of the optical source 5 controls the back-face output light from the optical element 5 by a photo diode or photo diode (PD) 6. The modulator output light is stabilized by an auto power control (APC) 11 which compensates for the difference between the back-face output light and a feed back to the current source 10.

Still referring to FIG. 2, the light of the optical element 5 is absorbed by the EA optical modulator 4 and is changed into the photoelectric current Iph. The amount of Iph changes according to the optical output power of the optical element 5 and a voltage level applied to the EA optical modulator 4. The applied voltage level to the EA optical modulator 4 and the modulator output light 7 are kept constant by monitoring the amount of Iph at an electronic absorption monitor 25 and by feeding back to the driving part 8 through the bias and amplitude controller 9.

FIG. 3 shows an example of the transmitter in JA9-179079. In the figure, the modulator output light from the EA optical modulator is divided by an optical coupler 15. One output becomes the modulator output light 7 while the other one is inputted into a photo diode (PD) or optical detector 16 to indicate a change in the optical output power and to control a current source 10 via a calculating part 12 for maintaining a constant optical output power level to an optical element 5.

Next FIG. 4 shows an example of the transmitter in JP6-152043. In the figure, two EA optical modulators 4 and 17 are respectively located at either side of an optical element 5. The modulator output light 7 is kept constant by feeding the change amount in the back-face optical output from a current source 10.

Consequently, when the alpha parameter is controlled to improve the fiber transmission characteristic of the optical transmitter, a driving point at which the EA optical modulators 4 and 17 are driven is changed and the optical output of the optical transmitter is also changed. Generally, it is difficult to adjust the optical transmitter to achieve desired characteristic specifications since the fiber transmission characteristic and the optical transmitter output cannot be determined at the same time.

In the transmitter as shown in FIG. 2 it is possible to keep constant the fiber transmission characteristic that is affected by the change in the electronic absorption as indicated by Iph. However, since the electrical current source 10 is not controlled by the change of the electronic absorption, the optical output power is changed.

Iph is changed for compensating the change in the optical input power to the EA optical modulator 4 from optical element 5 or the driving point of the EA optical modulator 4. The applied voltage level to the EA optical modulator 4 is also changed at the same time. As a result, the alpha parameter is changed, and the fiber transmission characteristic is thus changed. Moreover, the above described steps are taken when the optical output changes due to degradation in the optical elements.

In an example shown in FIG. 3, the current in the current source 10 is adjusted based upon the change in the monitored optical power from an optical detector on PD 16. But, as the driving point for the EA optical modulator 4 in the driving part 8 changes, the alpha parameter dose not maintain a constant value. Also as one of the modulator output light is divided by the optical coupler 15, the loss of the modulator output for the transmission in the fiber becomes a substantial problem. It is undesirable to set the optical coupler 15 for dividing the optical output, and the costs of and space for other optical parts are prohibitive.

For example, as shown in FIG. 4, because the change in the output light from the optical element 5 changes the EA optical modulator driving point in the driving part 8, the alpha parameter does not remain constant either. Also, the two EA optical modulators 4 and 17 must have the same normalized optical output ratio characteristic. These EA optical modulators 4 and 17 have to have the same optical axis of the optical element 5 onto the identical chip. For this reason, it is difficult to make an integrated EA/DFB optical source.

SUMMARY OF THE INVENTION

Based upon the above, the aim of this invention is to provide the optical transmitter which has constant modulator output light and the highly reliable optical transmission system by using the optical transmitter.

The above optical transmission system is advantageous for the cost and the space and is simply implemented without an EA/DFB integrated optical source.

For the above stated solution, a method to monitoring a change in the driving point information which is caused by the alpha parameter optimum tuning or by compensating against the passing degradation of the optical element. To compensate, modulator optical output light is automatically changed due to the change in the above information.

In the first embodiment includes an electronic absorption monitor which measures an applied voltage value for driving the EA optical modulator from a driving part, a PD which detects an optical back-face output of the optical element, an optical element current source which applies a favorable current to the optical element, and a calculating or operating part which calculates the favorable current.

The calculating part takes a differential value between the electrical field absorption amount of the EA optical modulator and the optical back-face output and calculates the optical element driving electric current according to the differential value.

As the optical back-face output of the optical element changes according to the change in the current source and also as the electrical field absorption amount of the EA optical modulator changes with the fixed driving point, only the change in the fixed driving point of the EA optical modulator is detected based upon both of the above changes.

Consequently, when the driving point of the EA optical modulator is changed to control the alpha parameter, the optical element current source is fixed according to the change in the Iph so as to keep the modulator output constant.

In the second embodiment, the driving part has two outputs, and one output has a controlling function of the bias of the EA optical modulator. The second embodiment includes the calculating (operating) part and a controlling function unit which monitors the average driving voltage level (hereafter, called "Vdata") for controlling bias of the EA optical modulator, the average driving voltage level (hereafter, called "Vbar") for not controlling bias of the EA optical modulator, and the PD voltage level (hereafter, called "Vpd") for detecting back-face output light of the optical element. The current source applies a favorable current level to the optical element based upon Vdata, Vbar and Vpd.

Here, the Vdata is changed according to the change in the driving current of the optical element and the driving point of the EA optical modulator. The Vbar is changed according to the change in the driving point of the EA optical modulator while the Vpd is changed according to the change in the driving current of the optical element.

Consequently, the relation among Vdata, Vbar, and Vpd is shown in equation (1) as follows:

$$|V\text{data}|+|V\text{bar}|-|V\text{pd}|=c \qquad (1)$$

(c is a constant value).

Where the value of c is a constant under some optical output. The modulator output is maintained constant by controlling the c value constant.

DESCRIPTION OF THE PREFERRED EMBODIMENTS

Hereafter the Embodiment example of this invention is explained by using the figures.

Figure 1:
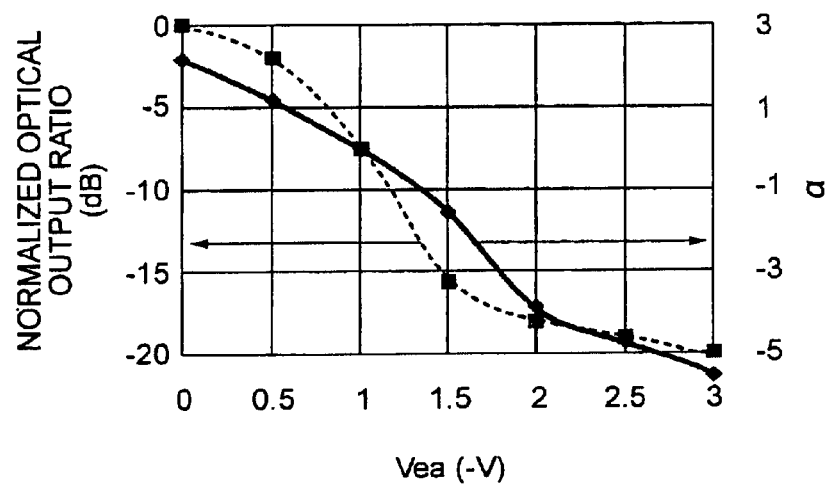
FIG. 1 is a prior art measurement result of the modulator chargeable voltage of the alpha parameter and the normalized optical output ratio characteristic of the EA optical modulator.
Figure 2:
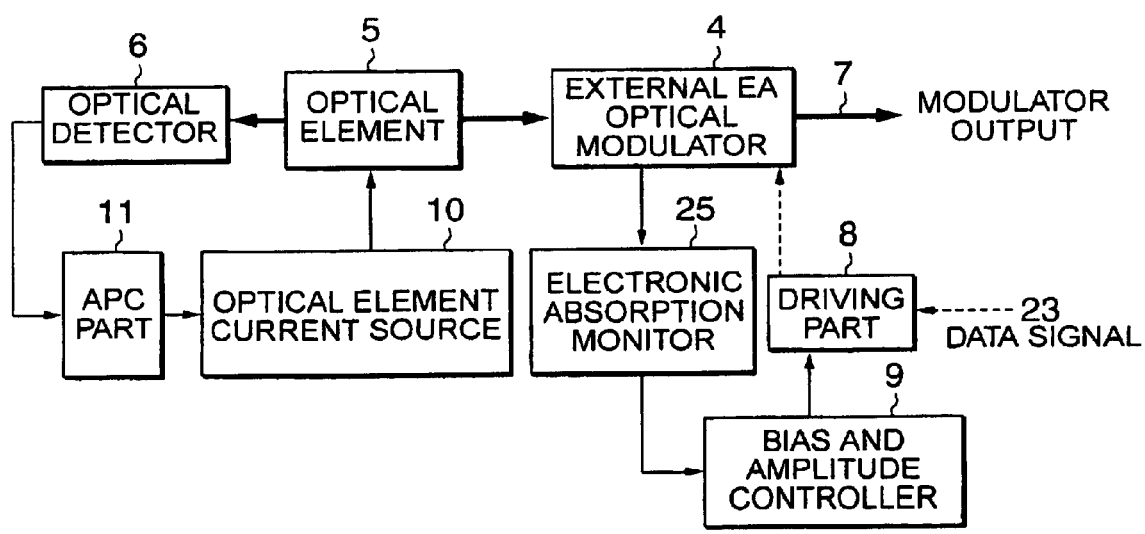
FIG. 2 is a block diagram of a related prior art optical transmitter.
Figure 3:
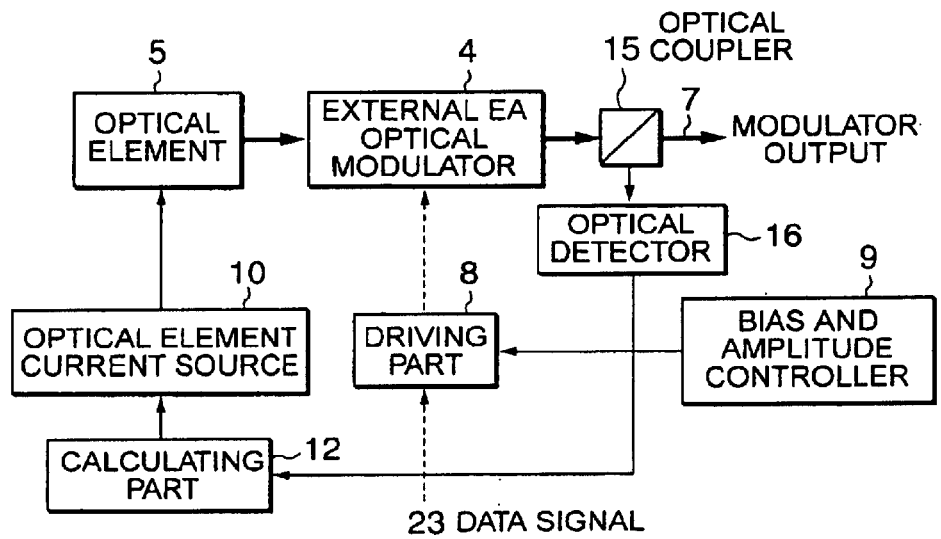
FIG. 3 is a block diagram of another related prior art optical transmitter.
Figure 4:
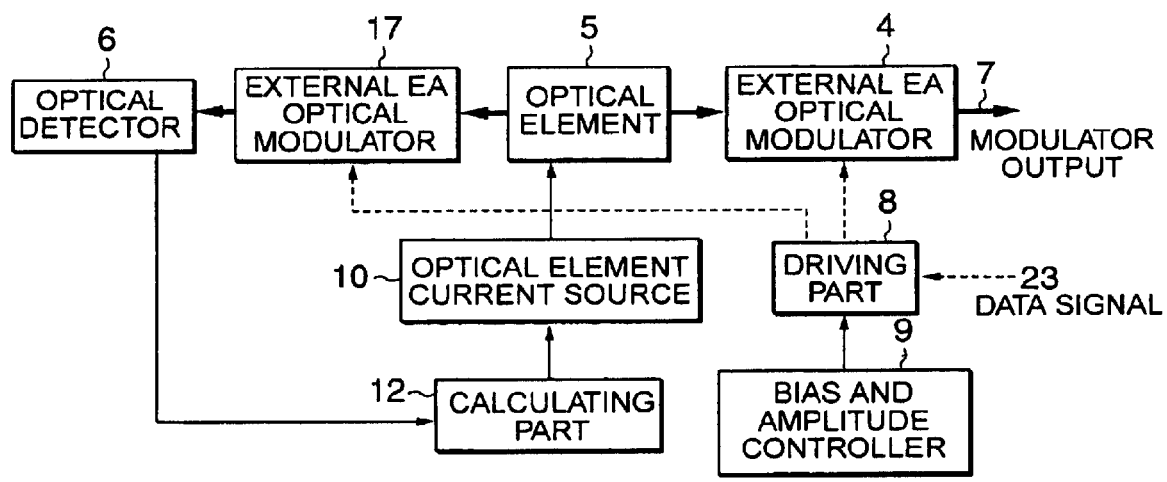
FIG. 4 is a block diagram of yet another related prior art optical transmitter.
Figure 5:
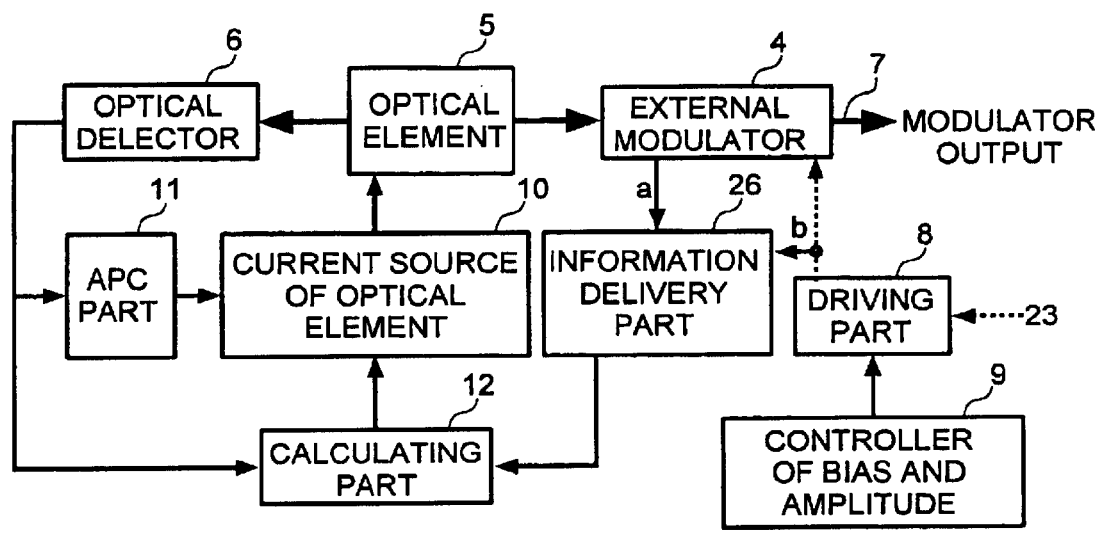
FIG. 5 is a block diagram of the light transmitter.

The best examplary embodiment of the optical transmitter according to the current invention is shown in FIG. 5 and includes an optical element 5, an optical element current source 10, an EA optical modulator 4 which modulates the front-face optical output of the optical element, a driving part 8 which drives the EA optical modulator 4 and receives an input data signal 23 to be transmitted, a bias and amplitude controller 9 which controls the bias voltage and the amplitude voltage of the driving part 8, an information delivery part 26 which transmits the information monitored the EA optical modulator and the driving part 8, a calculating part 12 which sets up the driving current of the optical element 5 using the changed value of the information delivery part 26, an optical detector 6 which monitors the back-face optical output of the optical element, and an APC part 11 which keeps the optical output of the optical element 5 constant for a long term based on the value monitored by optical detector 6. The bias and amplitude controller 9 may receive an external input signal for adjusting the bias voltage and the amplitude voltage.

The information delivery part 26 extracts the operation on setting information on the EA optical modulator 4 and transmits the information to the calculating part 12. The calculating part 12 controls the optical output according to the change in the operation information and the setting information.

Figure 6:
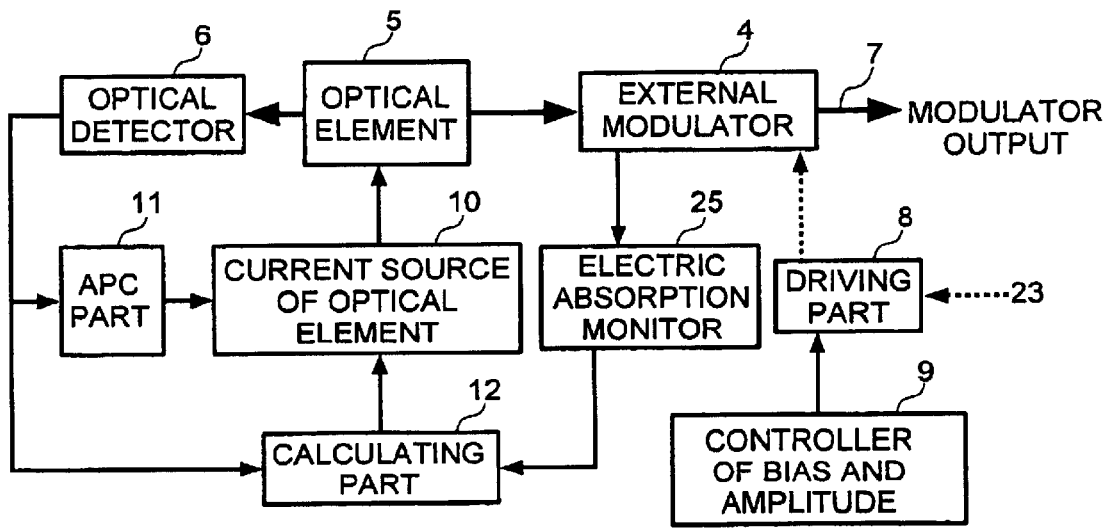
FIG. 6 is a block diagram of a one preferred embodiment of the optical transmitter according to the invention.

A first preferred embodiment of the optical transmitter of the invention is shown in FIG. 6. As it is shown in the figure, the optical transmitter includes an optical element 5, an optical element current source 10, an EA optical modulator 4 which modulates the front-face optical output of the optical element 5, a driving part 8 which drives an EA optical modulator 4, a bias and amplitude controller 9 which controls the bias voltage and the amplitude voltage of the driving part 8, an electronic absorption monitor 25 which monitors the applied voltage to the EA optical modulator 4, a calculating part 12 which sets up the driving current of the optical element 5 based upon the change in the electronic absorption monitor 25, an optical detector 6 which monitors the back-face optical output of the optical element 5, and, an APC 11 which keeps the optical output of the optical element 5 constant for a long term based upon the value monitored by the optical detector 6.

The calculating part 12 determines a differential value between the electrical field absorption amount of the EA optical modulator 4 and the optical back-face output of the optical element 5 and calculates driving electric current of the optical element 5 according to the above differential value.

As the optical back-face output power of the optical element 5 which is detected by the optical detector 6 depends on the driving current from the optical element current source 10, and the electronic absorption of the EA optical modulator 4 which is detected by the electronic absorption monitor 25 depends on the optical output of the optical element 5. For the information on the driving point of the EA optical modulator 4, it is possible to detect only the changing value of the EA optical modulator 4 by using the differential value between the output value of optical detector 6 and the output value of the electronic absorption monitor 25.

Consequently, if the alpha parameter is changed for controlling the driving point of the EA optical modulator 4, it is possible to keep the modulator output 7 constant by applying the current from the current source 10 that corresponds to a change in the driving point. On the actual tuning, the lower the driving current of the optical element is, the lower the pass penalty is. It is desirable to set the current source 10 for outputting a minimum modulator output 7 in the specification so as to expand the tuning range in the bias and amplitude controller 9 for controlling the alpha parameter.

Figures 7, 8:
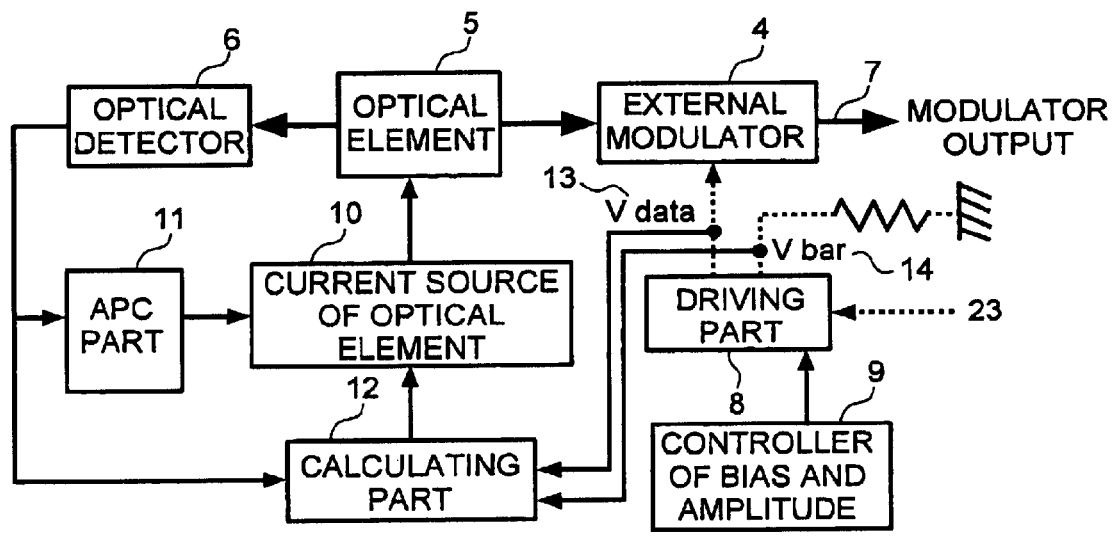
FIG. 7 is a block diagram of a second embodiment of the optical transmitter according to the invention.
FIG. 8 shows exemplary measurements of the adjustment parameter of the second preferred embodiment optical transmitter according to the invention.

The second preferred embodiment of the optical transmitter of the current invention is shown in FIG. 7. It supposes that the driving part 8 has two outputs and that it has the EA optical modulator bias controlling function based upon one of the outputs. In the driving part 8, the average driving voltage level Vdata 13 for controlling bias of the EA optical modulator 4, the average driving voltage level Vbar 14 for not controlling bias of the EA optical modulator 4, and the PD voltage level Vpd for indicating a back-face output light level of the optical element 5 is inputted to the calculating part 12.

Here, the Vdata is changed according to the driving current change of the optical element 5 and the driving point change of the EA optical modulator 4. The Vbar is changed according to the driving point change of the EA optical modulator 4, and the Vpd is changed according to the driving current change of the optical element 5. Consequently equation 1 is formed as follows:

$$|V\text{data}|+|V\text{bar}|-|V\text{pd}|=c \qquad (1)$$

(c is a constant value).

At this time, c takes a constant value under some optical output.

FIG. 8 shows a measurement result of the Vdata, the Vbar and the Vpd which are tuned for keeping the optical output constant (0 dBm) while the driving point of the EA optical modulator is changed in the optical transmitter which has the EA/DFB optical integrated source.

The VOH, the VOL in the figure respectively show the high level, low level of the EA optical modulator driving point. Because $|V\text{data}|+|V\text{bar}|-|V\text{pd}|$ becomes approximately 1055–1070 mV, it seems in the circuit that the value calculated by the calculating part 12 is always controlled to keep constant.

Figure 9:
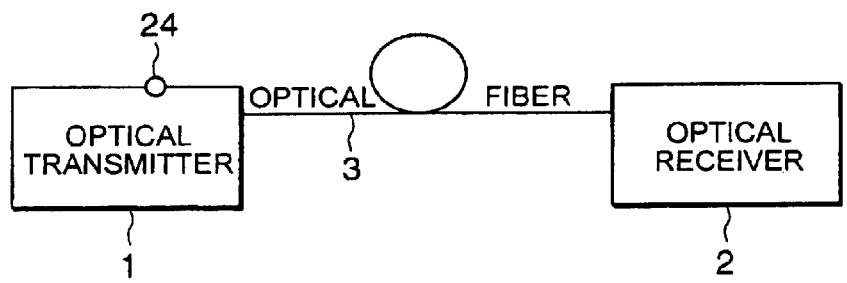
FIG. 9 is a block diagram of an optical transmission system which includes the optical transmitter of the current invention.

The exemplary components of the optical transmission system includes the optical transmitter 1 of the current invention as shown in FIG. 9. The optical transmission system also includes the optical fiber 3 that transmits the optical signal which is output from the optical transmitter 1 and the optical receiver 2 which receives the optical signal through the optical fiber 3. The optical transmitter 1 has the volume terminal 24 which controls alpha parameter. When the alpha parameter is controlled, because the power of the optical output by the optical transmitter 1 doesn't change, while the optical output specification of the optical transmitter is maintained, it is possible to set the optimal alpha parameter for the system.

Figure 10:
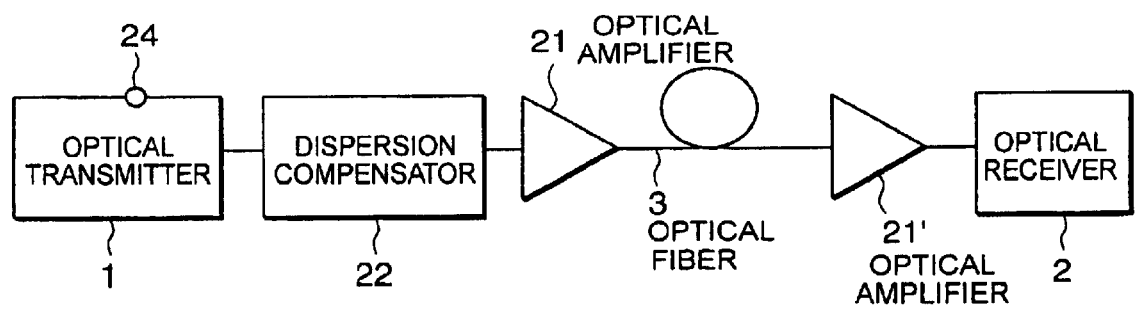
FIG. 10 is a block diagram of another optical transmission system which includes the optical transmitter of the current invention.

For example, in the current invention, it is also possible to include in the optical transmission system uses an optical amplifier, a dispersion compensator which is shown in FIG. 10, or both the optical amplifier and the dispersion compensator. The optical output of the optical amplifiers 21, 21' are set at an optional value. The optical output of the optical transmitter 1 is set within a in proper driving range, and the optical transmitter 1 has an alpha parameter value which is proper to all of the optical transmission system components including the dispersion compensated value of a dispersion compensator 22 that is tuned by a volume terminal 24. As the optical transmitter output is kept constant, the system prevents to have a signal-noise ratio degradation of waveforms due to low input power of the optical amplifier or self phase modulation (SPM) due to high input power of the optical amplifier. Furthermore, the volume terminal 24 in FIGS. 9 and 10 adjusts the applied voltage which makes the bias and amplitude controller 9 in other preferred embodiments.

According to the current invention, in the optical transmission system, as the optical output power of the transmitter meets the specification value, it is possible to set an optimum alpha parameter value. Moreover, it is possible to automatically compensate for the chirping and the optical output due to long-term degradation of the optical element characteristic.

According to the current invention, the monitor optical output change is implanted with monitoring not only in back-face but also in front-face. As for the location of the component, it is implemented either inside the optical transmitter or on the optical transmission system. When installing the monitor with optical output change on the optical transmission system, it is placed either on the side of the optical amplifier input or the side of the output, alternatively, on the side of the dispersion compensator input or the side of the output.

Figure 11:
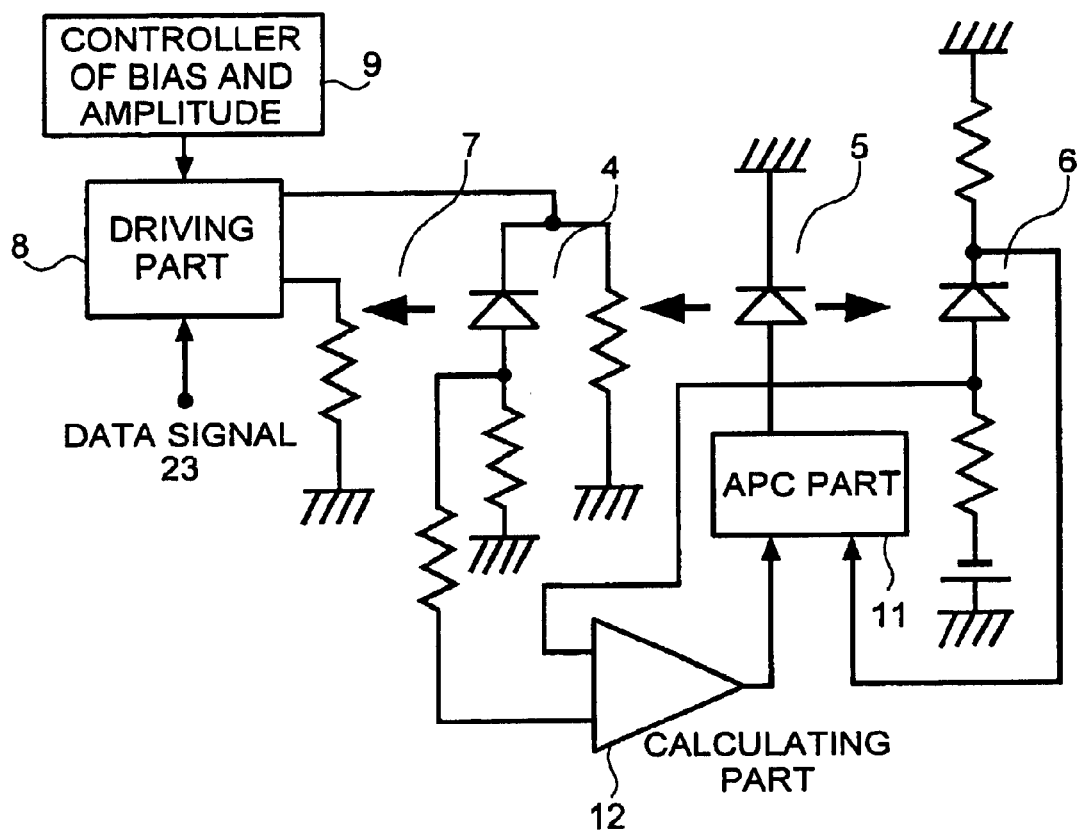
FIG. 11 is a block diagram illustrating a concrete exemplary implementation of the first embodiment of the optical transmitter according to the invention.

FIG. 11 shows the exemplary components of the embodiment according to the current invention as shown in FIG. 6. To measure the electronic absorption monitor amount from Vea directly for the EA optical modulator without the influence of a voltage drop due to a resistor in the EA optical modulator, the only change amount of Iph is monitored.

Figure 12:
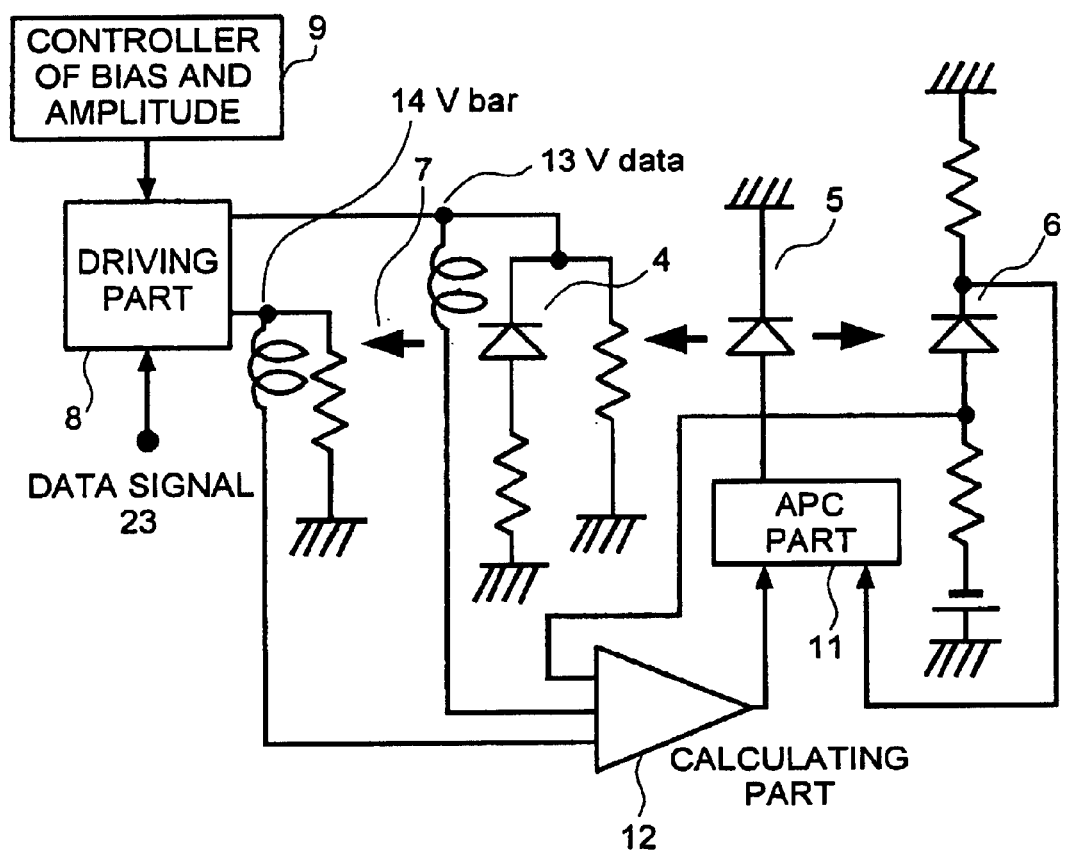
FIG. 12 is a block diagram illustrating a concrete example of the second embodiment of the optical transmitter according to the current invention.

FIG. 12 shows exemplary components of the preferred embodiment according to the invention as shown in FIG. 7. In the one preferred embodiment which doesn't have a bias controlling function, more out of the output from the drive part terminates in the resistor corresponding to the impedance characteristic of the driving part. It is desirable to collect monitoring points of Vdata and Vbar by using the coil without an influence by the high frequency characteristic.

According to the explanation above in this invention, if the alpha parameter of the optical transmitter is set to an optimum value for an optical transmission system, it is possible to keep the modulator output constant. Also, as it is possible to automatically compensate the degradation of the optical element characteristic. It is possible to tune the optical transmitter with ease, to apply in any optical transmission systems. As a result, highly reliable optical transmitter and optical transmission system are available.

What is claimed is:

1. An optical transmitter comprising:

an optical element for outputting a first optical signal and a second optical signal indicative of a back-face output;

an electronic absorption type external modulator connected to said optical element for modulating the first optical signal and for generating a modulated optical signal;

an electronic absorption monitor connected to said electronic absorption type external modulator for monitoring electronic absorption of the modulated optical signal and generating an absorption value indicative of the monitored electronic absorption;

an external modulator control unit connected to said electronic absorption monitor for determining a differential value between the absorption value and the second optical signal to control the modulated optical signal to a desired level, said external modulator control unit also generating an information signal including the differential value and indicative of operational parameters of said electronic absorption type external modulator; and an optical element control unit connected to said optical element and said external modulator control unit for controlling said optical element based upon the differential value and the second optical signal, wherein the first optical signal and the second optical signal are maintained at a constant level.

2. The optical transmitter according to claim 1 wherein said external modulator control unit further comprises:

a driving part connected to said electronic absorption type external modulator for generating a drive part output signal so as to drive said external modulator control unit;

a bias and amplitude controller connected to said driving part for generating a modulator drive signal indicative of a bias voltage value and a vibration amplitude voltage value; and an information delivery part connected to said electronic absorption type external modulator for generating the information signal.

3. The optical transmitter according to claim 1 wherein said external modulator control unit further comprises:

a bias and amplitude controller ultimately connected to said electronic absorption type external modulator for generating a modulator drive signal indicative of a bias voltage value and a vibration amplitude voltage value; and a driving part connected to said electronic absorption type external modulator for generating a drive part output signal based upon the modulator drive signal so as to drive said external modulator control unit.

4. The optical transmitter according to claim 3 wherein said bias and amplitude controller generates the modulator drive signal based upon the electronic absorption.

5. The optical transmitter according to claim 3 wherein said bias and amplitude controller generates the modulator drive signal based upon a duty ratio of said driving part, a high voltage level of said driving part and a low voltage level of said driving part.

6. The optical transmitter according to claim 3 wherein said bias and amplitude controller generates the modulator drive signal based on an average of positive and negative values of the drive part output signal.

7. The optical transmitter according to claim 1 wherein said optical element control unit further comprises:

an optical detector connected to said optical element for monitoring the second optical signal and generating a second optical monitored signal;

an automatic power control part connected to said optical detector for generating a first current source control signal based upon the second optical monitored signal;

a calculating part connected to said automatic power control part and said external modulator control unit for generating a second current source control signal based upon the first current control signal and the information signal; and an optical element current source connected to said automatic power control part, said calculating part and said optical element for controlling said optical element via an input current based upon said second current source control signal.

8. A method of controlling an optical transmitter comprising:

a) outputting a first optical signal and a second optical signal indicative of a back-face output from an optical element;

b) modulating the first optical signal by an external absorption type modulator;

c) generating a modulated optical signal;

d) monitoring electronic absorption of the modulated optical signal;

e) generating an absorption value based upon the monitored electronic absorption;

f) determining a differential value between the absorption value and the second optical signal to control the modulated optical signal to a desired level;

g) generating an information signal including the differential value and indicative of operational parameters of the electronic absorption type external modulator; and h) controlling said optical element based upon the information signal and the second optical signal, wherein the first optical signal and the second optical signal are maintained at a constant level.

9. The method of controlling an optical transmitter according to claim 8 wherein said step e) further comprises:

generating a modulator drive signal indicative of a bias voltage value and a vibration amplitude voltage value;

generating a drive part output signal based upon the modulator drive signal indicative of a level at which an external modulator control unit; and generating the information signal based upon characteristics of the external absorption type modulator.

10. The method of controlling an optical transmitter according to claim 8 wherein said step e) further comprises:

generating a drive part output signal based upon the modulator drive signal indicative of a level at which the external modulator control unit operates; and generating a modulator drive signal indicative of a bias voltage value and a vibration amplitude voltage value.

11. The method of controlling an optical transmitter according to claim 10 wherein the modulator drive signal is based upon a duty ratio of said driving part, a high voltage level of said driving part and a low voltage level of said driving part.

12. The method of controlling an optical transmitter according to claim 10 wherein the modulator drive signal is generated based an average of positive and negative values of the drive part output signal.

13. The method of controlling an optical transmitter according to claim 8 wherein said step h) further comprises:

monitoring the second optical signal and generating a second optical monitored signal;

generating a first current source control signal based upon the second optical monitored signal;

generating a second current source control signal based upon the first current control signal and the information signal; and controlling said optical element via an input current based upon said second current source control signal.

14. An optical transmitter comprising:

an optical element for outputting a front-face optical output signal and a back-face optical output signal;

an electronic absorption type external modulator connected to said optical element for modulating the front-face optical output signal and for generating a modulated optical signal;

an electronic absorption monitor connected to said electronic absorption type external modulator for monitoring electronic absorption of the modulated optical signal and generating an absorption value indicative of the monitored electronic absorption;

an external modulator control unit connected to said electronic absorption monitor and said electronic absorption type external modulator for correcting a bias shift in the modulated optical signal to a desired level based upon the modulated optical signal, said external modulator control unit also generating an information signal including the monitored electronic absorption value;

an optical detector connected to said optical element for monitoring the back-face optical output signal indicative of a long-term degradation level of said optical element; and an optical element control unit connected to said optical element and said external modulator control unit for controlling said optical element based upon the information signal and the back-face optical output signal so that the front-face optical output signal and the back-face optical output signal are corrected to a constant level.

15. A method of controlling an optical transmitter, comprising the steps of:

a) outputting a front-face optical output signal and a back-face optical output signal from an optical element;

b) modulating the front-face optical output signal by an external absorption type modulator;

c) generating a modulated optical signal;

d) monitoring electronic absorption of the modulated optical signal;

e) correcting a bias shift in the modulated optical signal to a desired level based upon the modulated optical signal at an external modulator control unit;

f) generating an information signal including the electronic absorption value on the modulated signal;

g) monitoring the back-face optical output signal indicative of a long-term degradation level of the optical element; and h) controlling the optical element based upon the information signal and the back-face optical output signal, wherein the front-face optical output signal and the back-face optical output signal are corrected at a constant level.

16. An optical transmitter comprising:

an optical element for outputting a first optical signal and a second optical signal;

an electronic absorption type external modulator connected to said optical element for modulating the first optical signal and for generating a modulated optical signal;

an external modulator control unit connected to said electronic absorption type external modulator for controlling the modulated optical signal to a desired level based upon the modulated optical signal, said external modulator control unit also generating an information signal;

an optical element control unit connected to said optical element and said external modulator control unit for controlling said optical element based upon the information signal and the second optical signal, wherein the first optical signal and the second optical signal are maintained at a constant level;

a bias and amplitude controller ultimately connected to said electronic absorption type external modulator for generating a modulator drive signal indicative of a bias voltage value and a vibration amplitude voltage value;

a driving part connected to said electronic absorption type external modulator for generating a drive part output signal based upon the modulator drive signal so as to drive said external modulator control unit; and an electronic absorption monitor connected to said electronic absorption type external modulator for monitoring electronic absorption of the first optical signal and generating the information signal, wherein said bias and amplitude controller generates the modulator drive signal based upon a duty ratio of said driving part, a high voltage level of said driving part and a low voltage level of said driving part.

17. A method of controlling an optical transmitter, comprising the steps of:

a) outputting a first optical signal and a second optical signal from an optical element;

b) modulating the first optical signal by an external absorption type modulator;

c) generating a modulated optical signal;

d) controlling the modulated optical signal to a desired level based upon the modulated optical signal at an external modulator control unit, said step d) further comprising the following steps of:

d1) generating a modulator drive signal indicative of a bias voltage value and a vibration amplitude voltage value, wherein the modulator drive signal is based upon a duty ratio of a driving part, a high voltage level of the driving part and a low voltage level of the driving part;

d2) generating a drive part output signal based upon the modulator drive signal indicative of a level at which the external modulator control unit operates;

d3) monitoring electronic absorption of the first optical signal; and d4) generating the information signal based upon the electronic absorption.

e) generating an information signal on the modulated signal; and f) controlling the optical element based upon the information signal and the second optical signal, wherein the first optical signal and the second optical signal are maintained at a constant level.

* * * * *